March 13, 1928. 1,662,091
J. G. VUOZZO
HOLDER FOR TREES AND THE LIKE
Filed Dec. 2. 1926
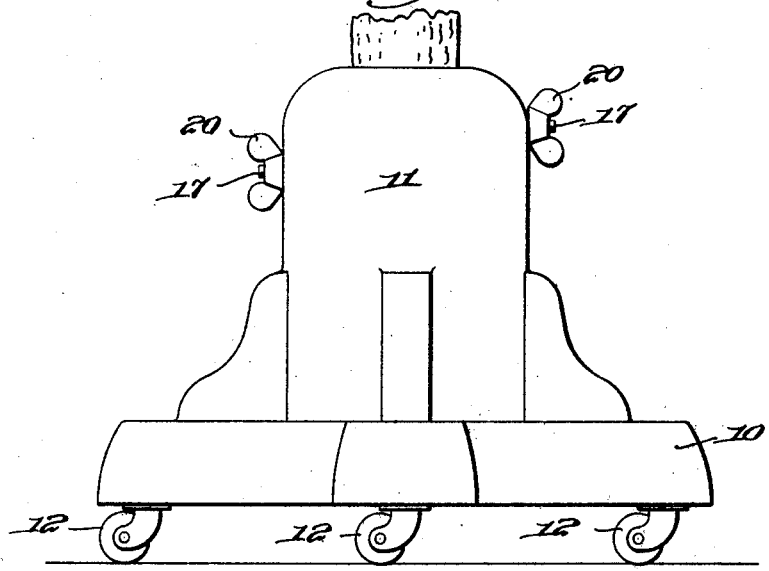
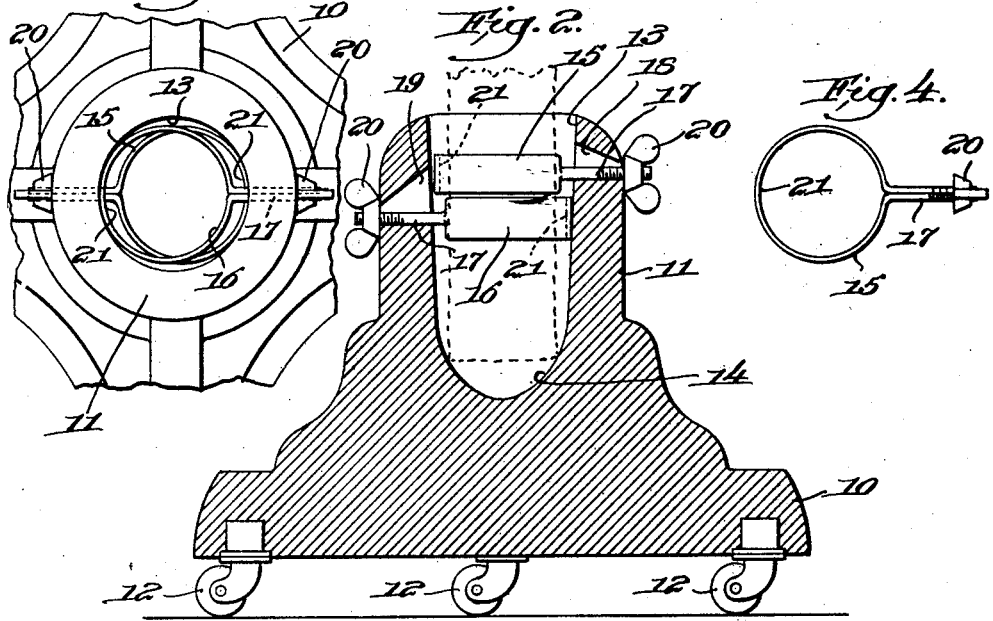
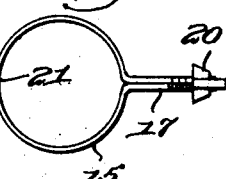
Inventor;
Joseph G. Vuozzo,
by Edward F. Allen
his Atty.

Patented Mar. 13, 1928.

1,662,091

UNITED STATES PATENT OFFICE.

JOSEPH GIACENTO VUOZZO, OF CORONA, NEW YORK.

HOLDER FOR TREES AND THE LIKE.

Application filed December 2, 1926. Serial No. 152,243.

This invention relates to a holder for trees and the like, and more particularly to a Christmas tree holder for indoor use.

It is an object of the invention to provide a substantial and durable tree holder which is adapted to receive and firmly support trees, or the like, of various sizes as regards the butts thereof.

It is a further object of the invention to provide a tree holder of simple and cheap construction which may be readily and easily moved from place to place when a tree or the like is mounted therein.

Other objects of the invention will be fully understood from a description of the drawing and the claims hereinafter given.

Of the drawing.

Figure 1 represents a side elevation of the holder having a tree mounted therein.

Figure 2 is a vertical section through the holder shown in Figure 1, the tree butt being shown in dotted lines.

Figure 3 is a top plan view of a portion of the holder.

Figure 4 is a view of one of the tree butt clamping bands removed from the holder.

Like characters represent like parts throughout the several figures of the drawing.

Referring to the drawing.

The drawing herewith illustrates one form of tree holder embodying the invention but it will be understood that it is not the intention to limit the invention to the precise construction and arrangement shown herein as changes might be made therein without departing from its spirit and scope.

The base 10 having the upstanding hollow cylindrical portion 11 is preferably made of cast metal for the purpose of giving weight, and consequently stability to the holder, and also enabling the use of a base of comparatively small area.

For the purpose of moving the holder from place to place it is preferred to supply it with trucks or castors 12.

The bore 13 of the portion 11 is preferably concaved as at 14, see Figure 2, so that the butt ends of the tree will have a tendency to wedge therein thus forming a firm resting place for butts of various sizes.

Adjacent the mouth of the bore 13 two clamp bands 15 and 16 are arranged, in this instance one above the other, each having a stem portion 17, the stem of the clamp band 15 being extended through an opening or slot 18 at one side of the portion 11, and the stem of the band 16 being extended through an opening 19 diametrically opposite the opening 18.

Each of the stems 17 is provided with a thumb nut 20 engaging threads on the said stems which may be solid but are shown herein as split longitudinally, and being formed from the ends of the bands.

The bands are smaller in diameter than the bore 13, and may be made of spring metal if desired, and they are so disposed as to have a tree butt passed through them whereupon the thumb nuts 20 will be turned to draw each band or the portion 21 thereof toward the tree which action causes the tree butt to be firmly clamped between the said portions 21.

As the slots or openings 18 and 19 are of such a width as to prevent appreciable lateral movement of the stems 17 it will be readily seen that the tree butt may be restrained from lateral movement in any direction.

In practice the bands will be made in such manner as to accommodate various sizes of tree butts.

Having described the invention I claim:

A tree holder of the class described comprising a weighted base having an upstanding portion bored to receive tree butts of various sizes, said bore terminating in a concaved surface to form a resting place for various sizes of tree butt ends; clamp bands arranged in said bore adjacent the mouth thereof one above another each having a stem forming part thereof, and extending through a slot in the wall of said upstanding portion diametrically opposite to one another, each stem being threaded to receive a thumb nut whereby said bands may be drawn towards a tree butt passing through them to thereby clamp a tree butt between them.

JOSEPH GIACENTO VUOZZO.